(12) United States Patent
Matsumoto et al.

(10) Patent No.: US 7,680,391 B2
(45) Date of Patent: Mar. 16, 2010

(54) REMOTE CONTROL SYSTEM FOR DEVICE CONNECTED TO NETWORK

(75) Inventors: Yuichi Matsumoto, Kanagawa (JP); Masaki Kutsuna, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1345 days.

(21) Appl. No.: 10/021,523

(22) Filed: Dec. 12, 2001

(65) Prior Publication Data
US 2002/0075416 A1 Jun. 20, 2002

(30) Foreign Application Priority Data
Dec. 14, 2000 (JP) .............................. 2000/380439

(51) Int. Cl.
H04N 5/76 (2006.01)
H04N 7/00 (2006.01)
H04N 5/232 (2006.01)
(52) U.S. Cl. .................................... 386/46; 348/211.99
(58) Field of Classification Search .................... 386/1, 386/95, 121, 46; 348/734, 211.99
See application file for complete search history.

(56) References Cited

U.S. PATENT DOCUMENTS

| 5,543,925 | A | * | 8/1996 | Timmermans | 386/40 |
| 5,701,141 | A | * | 12/1997 | Schmenk et al. | 345/157 |
| 5,973,688 | A | * | 10/1999 | May | 715/709 |
| 6,040,829 | A | * | 3/2000 | Croy et al. | 715/864 |
| 6,166,778 | A | * | 12/2000 | Yamamoto et al. | 348/569 |
| 6,262,780 | B1 | * | 7/2001 | Ho et al. | 348/734 |
| 6,381,507 | B1 | * | 4/2002 | Shima et al. | 700/83 |
| 6,523,696 | B1 | * | 2/2003 | Saito et al. | 709/223 |
| 6,765,557 | B1 | * | 7/2004 | Segal et al. | 345/173 |
| 6,788,241 | B2 | * | 9/2004 | Arling et al. | 341/176 |
| 6,906,696 | B2 | * | 6/2005 | Allport | 345/156 |
| 7,477,236 | B2 | * | 1/2009 | Ofek et al. | 345/158 |
| 2001/0013823 | A1 | | 8/2001 | Hatakeyama et al. | 340/3.1 |

FOREIGN PATENT DOCUMENTS

JP 11-003314 A 6/1999

OTHER PUBLICATIONS

IEC 61883-1, Consumer audio/video equipment—Digital interface—Part 1: General, First edition, Feb. 1998, pp. 1-77.
TA Document 1998016, AV/C Compatible Asynchronous Serial Bus Connections, Version 1.0, 1394 Trade Association, Jan. 26, 1999, pp. i-viii and 1-48.
TA Document 1998011, AV/C commands for management of Asynchronous Serial Bus Connections, Version 1.0, 1394 Trade Association, Jan. 26, 1999, pp. i-v and 1-55.
TA Document 1999039, AV/C Panel Subunit Specification 1.0, 1394 Trade Association, Jul. 10, 2000, pp. 1-41.

* cited by examiner

*Primary Examiner*—Thai Tran
*Assistant Examiner*—Gelek Topgyal
(74) *Attorney, Agent, or Firm*—Cowan, Liebowitz & Latman, P.C.

(57) ABSTRACT

A control device remotely controls a controlled device. The control device includes a display unit, a communication unit and a control unit. The display unit displays a control panel of the controlled device. The control unit produces operation information. The communication unit sends the operation information to the controlled device. The operation information includes a shifting history of a cursor displayed on the control panel. The shifting history includes identification information of buttons depressed by the cursor in a single operation.

12 Claims, 14 Drawing Sheets

FIG. 5A

| Destination_ID | TI | Rt | tcode | Pri |
|---|---|---|---|---|
| Source_ID | | | | |
| Destination_offset | | | | |
| Quadlet_data(FCP frame) | | | | |
| Header_CRC | | | | |

Quadlet_write

FIG. 5B

| Destination_ID | TI | Rt | tcode | Pri |
|---|---|---|---|---|
| Source_ID | | | | |
| Destination_offset | | | | |
| data_Length | Extended_tcode | | | |
| Header_CRC | | | | |
| Block_data(FCP frame) | | | | |
| "0"padding(if necessary) | | | | |
| Data_CRC | | | | | block_write

| BUTTON ID | BUTTON ID |
|---|---|
| 301 | REPRODUCTION BUTTON 301 |
| 302 | STOP BUTTON 302 |
| 303 | REWIND BUTTON 303 |
| 304 | FORWARD BUTTON 304 |
| 305 | TEMPORARY STOP BUTTON 305 |
| 306 | RECORD BUTTON 306 |

| HISTORY ID | CONTENTS 1 | CONTENTS 2 |
|---|---|---|
| 503 | 301 | 303 |
| 504 | 301 | 304 |

PRIOR ART

PRIOR ART

PRIOR ART

REMOTE CONTROL SYSTEM FOR DEVICE CONNECTED TO NETWORK

BACKGROUND OF THE INVENTION

1. Field of the Invention

The present invention relates to a remote control system for remotely controlling network devices on a network.

2. Related Background Art

In the past, it has been greatly requested that household audio visual (AV) equipments and/or electrical equipments which are operated solely or operated in connection with another equipment be interconnected by a single network. Such request has been satisfied by a high speed digital communication technique capable of transferring data such as moving image data and voice data which require real time ability and data such as still image data and control data which require reliability of transfer in a mixed condition.

As one method for controlling peripheral equipments interconnected by the network by means of a host equipment, in a household network, a technique in which the host equipment is constituted by a television which provides a user interface and a control panel for operating the peripheral equipment is displayed on a screen of the television and the operator can effect setting in the control panel by using a remote controller of the television so that the peripheral equipments are controlled by the television itself on the basis of such setting is considered.

However, in the above-mentioned method, it is required that the control panel to be displayed and command/program for effecting the control on the basis of the user's setting be previously prepared in the television. Since such command and program must be prepared for each peripheral equipment and many peripheral equipments are connected to the network, the numbers of the control panels, commands and programs are increased considerably. Further, since it is naturally guessed that new equipments are added to the network in the future, if control panels, commands and programs for all of equipments which are to be additionally connected to the network are prepared in the television, the number of the control panels, commands and programs will be further increased. Furthermore, it is impossible to prepare control panels, commands and programs for the future equipments.

In order to solve the above problems, for example, Japanese Patent Application Laid-open No. 11-3314 proposes a system in which control panels are sent from controlled devices connected to a network and a control device such as a television having a display device receives such control panels to display the control panels for the operator so that the operator can send his operation inputs to the controlled devices to control the latter.

FIG. 14 is a block diagram showing a construction of such a conventional remote control system.

In FIG. 14, the system includes a network 300, a controlled device 310 and a control device 320. The controlled device 310 sends a control panel of the controlled device 310 to the control device 320. The control device 320 displays the control panel of the controlled device 310 on a display device 324. The operator manipulates or handles the control panel displayed on the display device of the control device 320 to remotely control functions of the controlled device 310.

However, the conventional remote control system arises a problem that, if the functions of the controlled device 310 are highly progressed, the number of operation buttons, switches and the like is also increased accordingly. Thus, the operator manipulating the control device 320 is compelled to complicated operation. Namely, for the operator, there arises a problem that, although he can control higher functions remotely, he is compelled to the complicated operation. Now, this is explained concretely.

For example, when it is assumed that the control device 320 is constituted by a television and the controlled device 320 is constituted by a digital photo-album device capable of effecting accumulation, display and edition of a digital image, a case where a control panel of the digital photo-album device is displayed on the television will be explained.

FIG. 15 is a view showing the control panel of the digital photo-album device displayed on the television in the conventional remote control system.

In FIG. 15, the reference numeral 350 denotes thumbnail-displayed digital photo images A to P which are elements to be selected. The reference numerals 351 to 354 denote process elements to be executed for one element selected among the digital photo images A to P, where the reference numeral 351 denotes display process; 352 denotes right turn process; 353 denotes left turn process; and 354 denotes deletion process. For example, in FIG. 15, since the process element "display" 351 is selected by reversely rotating (black spot displaying) a check box and a cursor is focused on the digital photo image G, when the operator depresses an execution key of a remote controller in this condition, the digital photo image G is displayed in a larger scale.

FIG. 16 is a view showing television screen on which the digital photo image G is displayed in the greater scale.

In FIG. 16, since the cursor is focused on a process element "return" 361, when the operator depresses the execution key of the remote controller in this condition, the control panel displayed on the television is returned to the display of FIG. 15.

Here, for example, it is assumed that the digital photo image C among the thumbnail-displayed digital photo images 350 is displayed in a lateral posture. For example, this corresponds to a photograph obtained by photo-taking an image by means a digital camera positioned in a vertical posture.

In this case, as the operator's manipulation, first of all, a cursor shifting key unit of the remote controller including an up shift key, a down shift key, a left shift key and a right shift key is appropriately manipulated to focus the cursor on the process element "left turn" 353, and then, the execution key is depressed in this condition. As a result, the check box for the process element "display" 351 is not selected and the check box for the process element "left turn" 353 is selected. FIG. 17 is a view showing the control panel of the digital photo-album device in the condition that the check box for the process element "left turn" 353 is selected.

Further, the cursor shifting key unit is appropriately manipulated to focus the cursor on the digital photo image C, and then, the execution key is depressed in this condition. As a result, the digital photo image C is turned by 90 degrees in an anti-clockwise direction and is displayed.

Next, a case where the operator tries to delete the digital photo image J among the thumbnail-displayed digital photo images 350 will be explained.

The operator appropriately manipulates the cursor shifting key unit to focus the cursor on the process element "deletion" 354, and then, the execution key is depressed in this condition. As a result, the check box for the process element "deletion" 354 is selected and the check boxes for the process elements 351 to 353 are not selected. Further, the cursor shifting key unit is appropriately manipulated to focus the cursor on the digital photo image J, and then, the execution key is depressed in this condition. FIG. 18 is a view showing the control panel of the digital photo-album device in the condition that the check box for the process element "deletion" 354 is selected.

As a result, the digital photo image J is deleted.

As mentioned above, although the operator can utilize the higher function remotely, he is compelled to the complicated manipulation. Further, in the data transfer effected between the control device and the controlled device, since the amount of data to be transferred is increased, there arises a problem that the transferring time is increased.

SUMMARY OF THE INVENTION

An object of the present invention is to solve the above-described problems.

Further, the present invention is made in consideration of the above-described problems, and another object of the present invention is to achieve excellent operability at a control device side and to reduce a transferring data amount between a control device and a controlled device.

A preferred embodiment of the present invention provides a control device for remotely controlling a controlled device connected to a network, comprising display means for displaying a control panel of the controlled device, and sending means for sending operation information representing a shifting history of a cursor displayed on the control panel to the controlled device.

Another preferred embodiment of the present invention provides a controlled device controlled remotely by a control device connected to a network, comprising sending means for sending a control panel of the controlled device to the control device, receiving means for receiving operation information representing a shifting history of a cursor displayed on the control panel, and control means for controlling a function corresponding to the operation information.

Still other objects of the present invention, and advantages thereof, will become fully apparent from the following detailed description of the embodiments.

BRIEF DESCRIPTION OF THE DRAWINGS

FIGS. 5A and 5B are views for explaining a structure of asynchronous transfer packet used in an FCP layer;

DETAILED DESCRIPTION OF THE PREFERRED EMBODIMENTS

First Embodiment

First of all, a first embodiment of the present invention will be explained.

Figure 1:
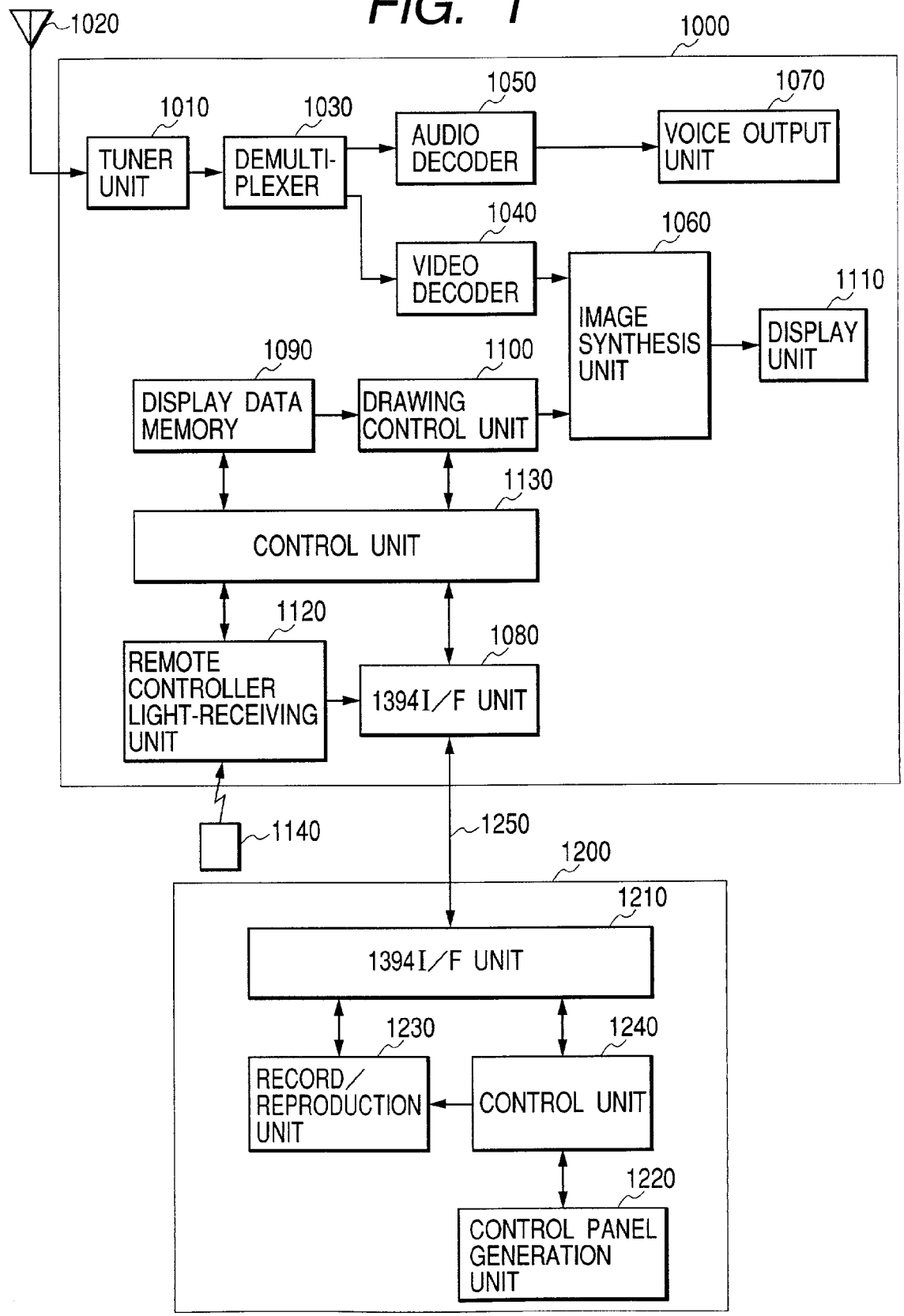
FIG. 1 is a block diagram for explaining a construction of a remote control system according to a first embodiment of the present invention.

FIG. 1 is a block diagram showing a construction of a remote control system according to the first embodiment.

In FIG. 1, the system includes a television image receiving machine 1000 functioning as a control device which can be controlled remotely by a remote controller 1140. Further, the television 1000 receives digital television broadcasting. The television includes a tuner unit 1010 which receives a signal from an antenna 1020 to demodulate received data and to correct an error and outputs MPEG-2 transport stream data (referred to as "TS data" hereinafter). Incidentally, the MPEG-2 transport stream data (referred to as "TS data" hereinafter) is defined in MPEG-2 system standard. The television also includes a demultiplexer 1030 which serves to pick up desired image data D1 and voice data D2 from the TS data in which image data and voice data for plural channels are time-share-multiplexed. Incidentally, the image data D1 is compressed and coded in accordance with the MPEG-2 standard. The picked-up image data D1 is sent to a video decoder 1040 and is decoded there, and the voice data D2 is sent to an audio decoder 1050 and is decoded there. The decoded image data is sent to an image synthesis unit 1060. The television also includes a voice output unit 1070 which is constituted by a D/A converter, an amplifier and a speaker and which serves to output the voice data decoded by the audio decoder 1050 as voice.

The television also includes a digital interface unit (referred to as "1394 interface" hereinafter) 1080 based on IEEE 1394-1995 standard, a display data memory 1090 for storing data of a control panel received by the 1394 interface 1080, and a drawing control unit 1100 which serves to produce an image of the control panel on the basis of the control panel stored in the display data memory 1090. The image synthesis unit 1060 serves to synthesize the image data decoded by the video decoder 1040 and the control panel produced by the drawing control unit 1100. The television further includes a display unit 1110 having a display device such as a liquid crystal display device and serving to display an image synthesized by the image synthesis unit 1060.

The television also includes a remote controller light-receiving unit 1120 which serves to receive/decode an infrared ray sent from a remote controller 1140 and to output a key code of a key manipulated by the operator via the remote controller 1140.

The television further includes a control unit 1130 having a memory and a microcomputer and serving to collectively control the 1394 interface 1080, display data memory 1090 and drawing control unit 1100. Further, the control unit 1130 also serves to produce control information on the basis of the key code outputted from the remote controller light-receiving unit 1120 and to send the control information from the 1394 interface 1080 to a controlled device.

The system includes a digital video cassette recorder (referred to as "VCR" hereinafter) 1200 functioning as the controlled device, a digital interface unit (referred to as "1394 interface" hereinafter) 1210 based on IEEE 1394-1995 standard and having the same construction as the 1394 interface 1080 of the television 1000, a control panel generation unit 1220 which serves to store or produce the control panel of the VCR 1200 and GUI (graphic user interface) data associated therewith, a record/reproduction unit 1230 which serves to record video data and audio data onto a storing medium such as a cassette tape, a magnetic disc or hard disc and/or to reproduce the video data and the audio data, and a control unit 1240 having a memory and a microcomputer. The control unit 1240 serves to control sending process for sending the control panel of the VCR 1200 from the VCR 1200 to the television 1000. The controller 1240 further serves to control an operation of the record/reproduction unit 1230 on the basis of control information sent from the television 1000 to the VCR 1200.

The television 1000 and the VCR 1200 are interconnected by a serial bus (referred to as "IEEE 1394 serial bus" hereinafter) based on the IEEE 1394-1995 standard via the 1394 interfaces 1080, 1210.

Figure 2:
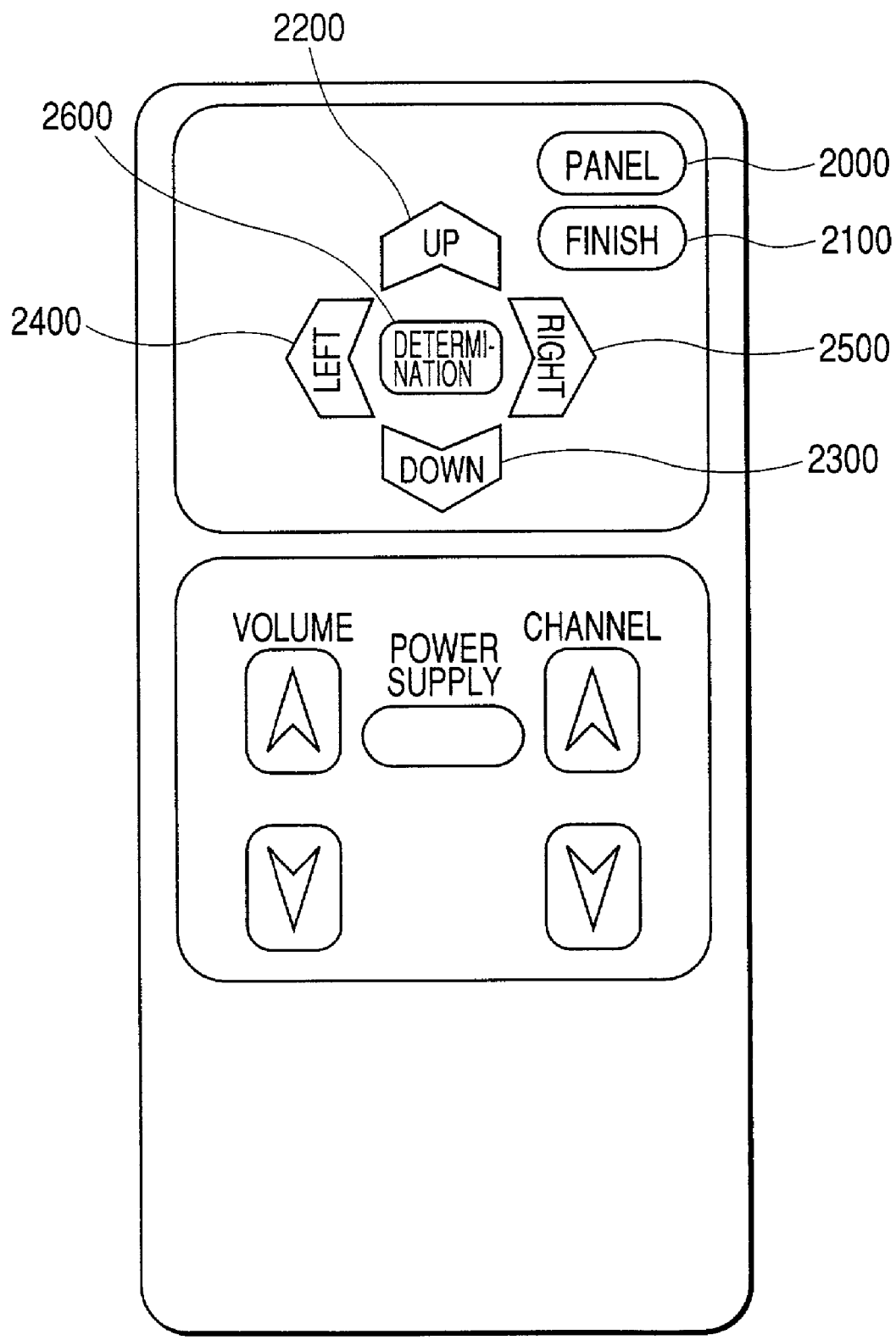
FIG. 2 is a view for explaining an operation unit of a remote controller 1140 for remotely controlling television 1000.

FIG. 2 is a view for explaining an operation unit of the remote controller 1140 for remotely controlling the television 1000.

As shown in FIG. 2, the remote controller 1140 includes a key for switching channels, a key for setting a voice amount of the television 1000, and a key for turning ON/OFF a power source of the television 1000. Further, the remote controller includes a "panel" key 2000 for requesting display of the control panel, and a "finish" key 2100 for requesting erasing of the control panel. Further, the remote controller includes an "up" key 2200, a "down" key 2300, a "left" key 2400 and a "right" key 2500 which are used for selecting buttons on the control panel. The remote controller further includes a "determination" key 2600 used for executing a function of the selected button.

Next, a fundamental function of the IEEE 1394 serial bus 1250 will be explained.

The IEEE 1394 serial bus 1250 is defined in the IEEE 1394-1995 standard and has characteristics such as connection, automatic setting and real time transferring which have high degree of freedom. That is to say, the IEEE 1394 serial bus 1250 can cope with topology of star type as well as topology of daisy chain type, thereby permitting connection having high degree of freedom. Further, the IEEE 1394 serial bus 1250 is a data transferring system in which serial transferring is effected at a transferring speed of 100 Mbps, 200 Mbps and 400 Mbps, and, since a node (equipment or device connected) having higher order transferring speed supports a lower order data transferring speed, in a system in which various nodes are connected via such an IEEE 1394 serial bus 1250, nodes having different transferring speeds can exist in a mixed condition. The IEEE 1394 serial bus 1250 has an automatic setting function so that, when a power source of the node is turned ON/OFF or when a new node is connected, such fact is automatically detected to effect bus reset. After the bus reset, confirmation of node and assignment of ID to various nodes are automatically effected. Further, in the IEEE 1394 serial bus 1250, a new node can be connected or any node can be disconnected without turning OFF the power sources of the nodes connected, and functions for bus reset, automatically confirmation of topology and automatic assignment of ID after disconnection and functions for plug and play can be realized. As data transferring modes, there are provided two modes, i.e., an asynchronous transferring mode suitable for transferring control signals such as command and file data, and isochronous transferring mode suitable for transferring data having time continuity such as moving image data and voice data.

Figure 3:
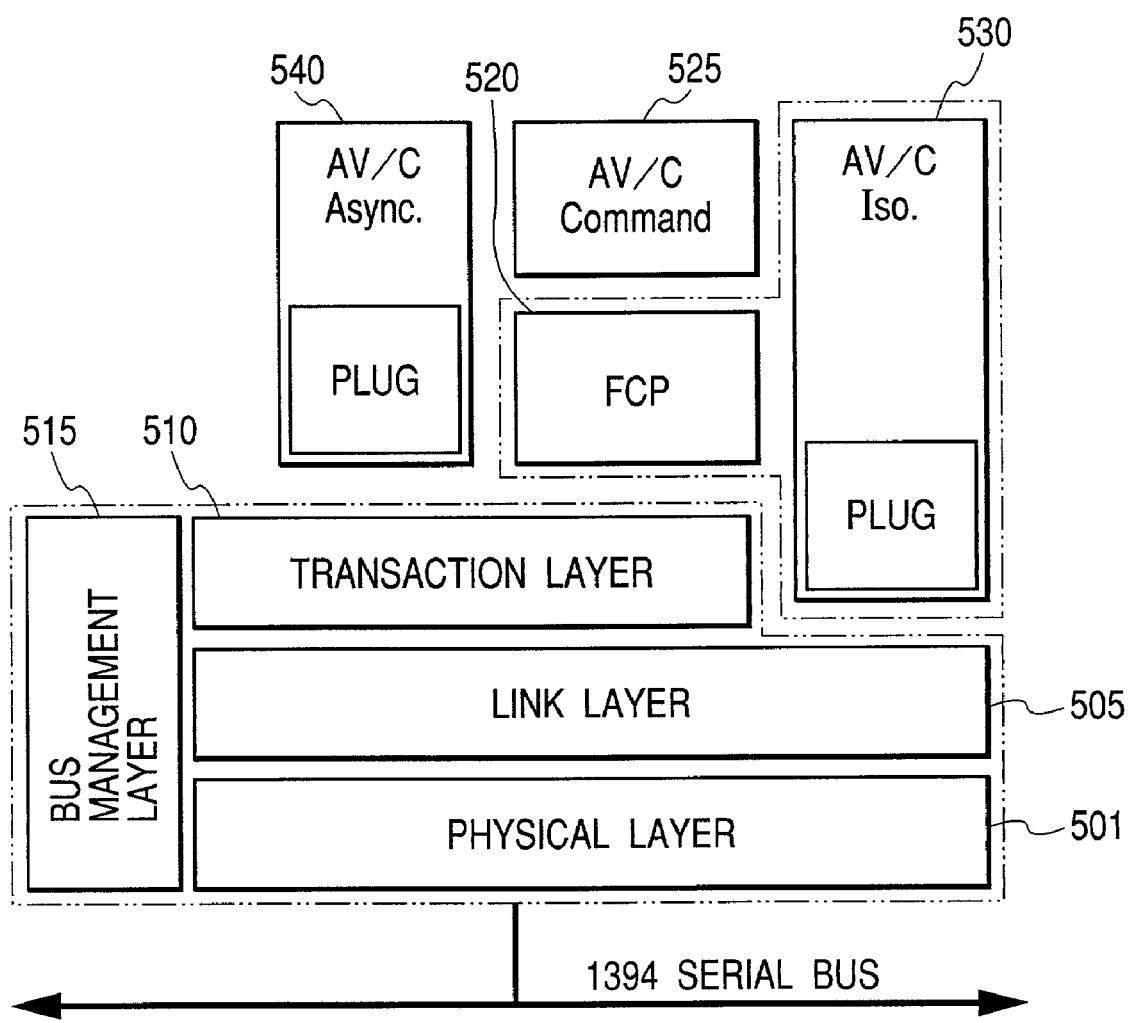
FIG. 3 is a view for explaining a laminate layer structure of an IEEE 1394 serial bus 1250.

FIG. 3 is a view showing a laminate layer structure of the IEEE 1394 serial bus 1250.

A physical layer 501 serves to define mechanical/electrical specification of cable/connector and to effect coding/decoding of input/output signals, initialization of the bus and mediation of use of bus. A link layer 505 serves to provide service for realizing communication of packet data between the physical layer 501 and a transaction layer 510. The transaction layer 510 serves to provide read transaction, write transaction and lock transaction which are services for realizing asynchronous transferring between the link layer 505 and a higher order layer such as application.

In the IEEE 1394 serial bus 1250, there are two bus management nodes, i.e., bus manager and isochronous resource manager (IRM). They may be the same node.

A bus management layer 515 serves to perform node control, isochronous resource management and bus management. The node control has CSRs (control status registers) provided in each node of the IEEE 1394 serial bus 1250 and defined in IEEE 1212 standard and performs management of asynchronous transferring between the nodes. The isochronous resource management is effected only by a node which is IRM and serves to afford a channel number and a band to the node to be isochronous-transferred and reserve the channel number and the ensured band used for the isochronous transferring. The bus management is effected only by the bus manager node and serves to perform management of connection information (formation of topology map), management of speed information (formation of speed map) and management of power source.

Figure 4:
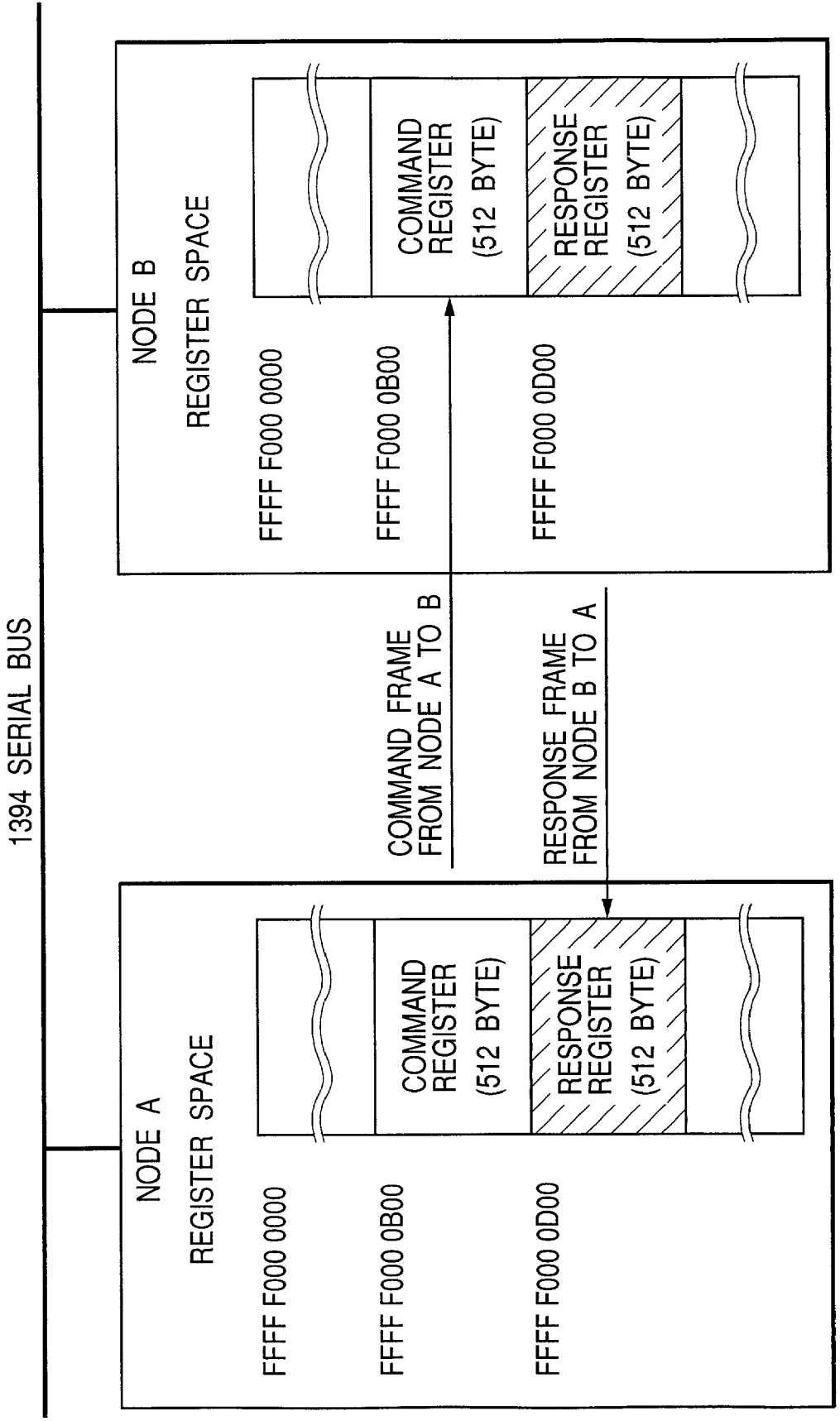
FIG. 4 is a view for explaining an FCP.

An FCP (function control protocol) layer 520 serves to perform communication of data having bytes smaller than 512 bytes called as command frame and response frame by using the asynchronous transferring, thereby permitting control between the nodes. The command frame is data written from the control node onto a command register of the controlled node. The response frame is data written from the controlled node onto a response register of the control node. Such a condition is shown in FIG. 4. FIG. 4 is a view showing communication of the command frame and the response frame based on FCP between a node A and a node B.

FIGS. 5A and 5B are views showing a structure of the asynchronous transferring packet used in the FCP layer 520. Command frame data or response frame data is written in a data portion of the packet.

Returning to FIG. 3, an AV/C command set layer 252 is an upper side layer for the FCP layer 520 and serves to apply connection control of AV/C isochronous transferring and control commands for AV equipments such as the television, monitor and VCR to the command frame and the response frame.

Figures 6, 7, 8:
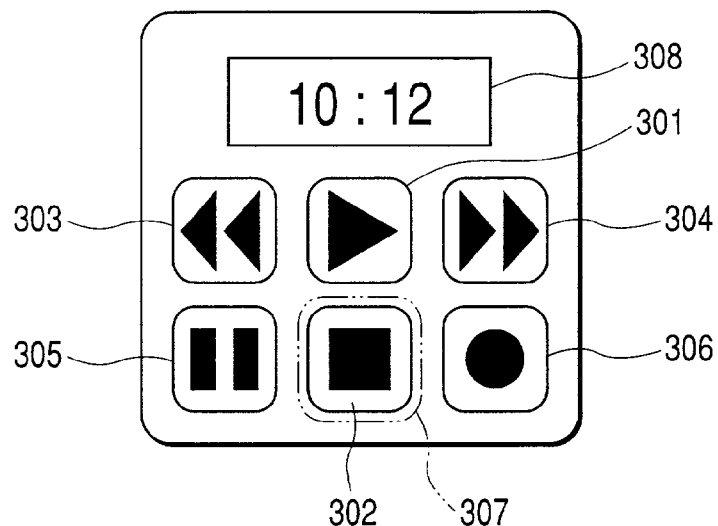
FIG. 6 is a view showing a control panel of a VCR 1200.
FIG. 7 is a view showing button IDs of various button elements.
FIG. 8 is a view showing a list of history elements.

FIG. 6 is a view showing an example of the control panel of the VCR 1200 shown in FIG. 1.

In FIG. 6, the control panel includes button elements 301 to 306, i.e., a reproduction button 301, a stop button 302, a rewind button 303, a fast feed button 304, a temporary stop button 305 and a record button 306. The reference numeral 307 denote a cursor added by the drawing control unit 1100

(FIG. 1); and 308 denotes a text element representing a present time or a tape running count. Here, it is assumed that the buttons 301 to 306 have button IDs shown in FIG. 7.

Further, in the first embodiment, for example, as shown in FIG. 8, there is provided a history element comprising "contents 1" and "contents 2", which history element is transferred together with the control panel. FIG. 8 shows a list of history elements, and history ID is set in each history element. That is to say, for example, the history element having history ID "503" has ID "301" of the button element as the contents 1 and ID "303" of the button element as the contents 2, and the history element having history ID "504" has ID "301" of the button element as the contents 1 and ID "304" of the button element as the contents 2.

Next, an operation of the television 1000 based on external operation will be explained with reference to FIG. 9.

Figure 9:
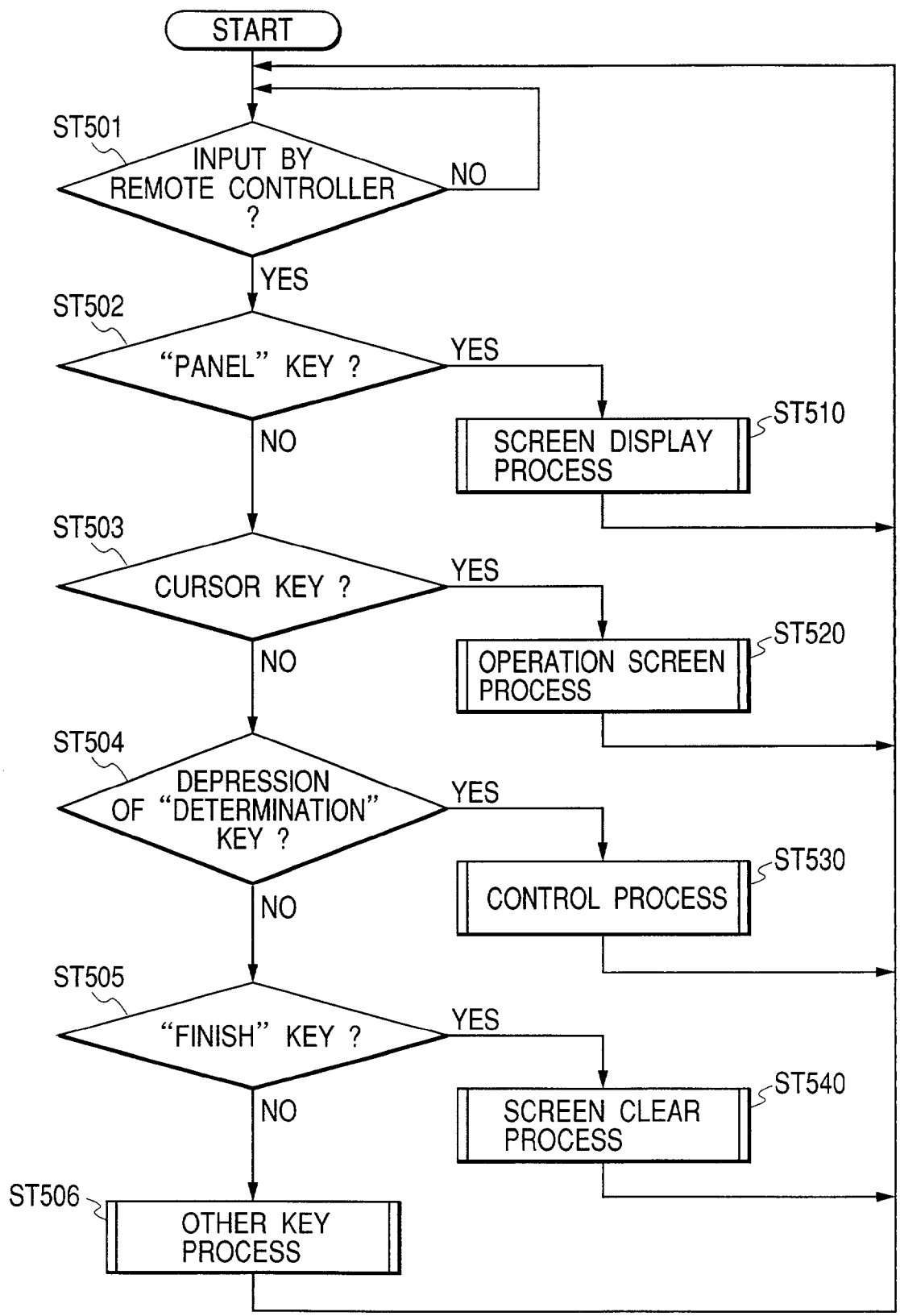
FIG. 9 is a flow chart showing procedure of operations based on external operation in the television.

FIG. 9 is a flow chart showing procedure of the operation of the television 1000 based on the external operation.

First of all, the control unit 1130 of the television 1000 monitors the key code sent from the remote controller light-receiving unit 1120 (step ST 501) and effects various processes on the basis of the key code.

Firstly, if the panel key 2000 is depressed, the screen display process is performed (step ST510).

Figure 10:
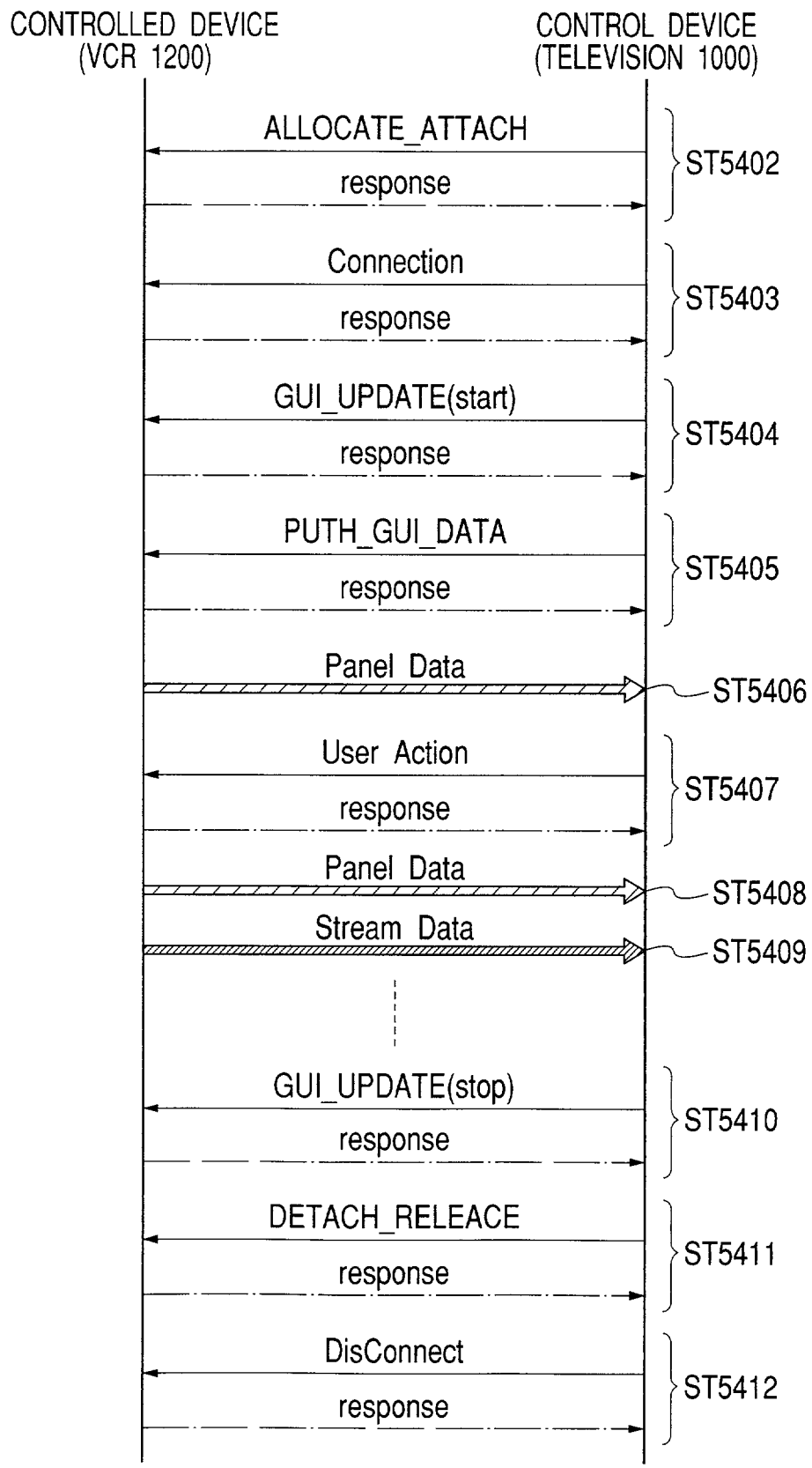
FIG. 10 is a sequence view showing procedure of screen display process.

FIG. 10 is a sequence view showing procedure of the screen display process.

First of all, the control unit 1130 of the television 1000 performs connection establishment in the AV/C asynchronous connection protocol layer 540 in accordance with the connection establishing procedure in order to transfer the control panel of the VCR 1200 to the television 1000 (steps ST5402, ST5403). When the connection is established, the control unit 1130 of the television 1000 issues GUI_UPDATE (start) command (step ST5404). The GUI_UPDATE (start) command is command for instructing the control unit 1240 of the VCR 1200 to send new control panel if the control panel is changed, and the control unit 1240 of the VCR 1200 obeys such instruction until it receives GUI_UPDATE (stop) command.

Figure 18:
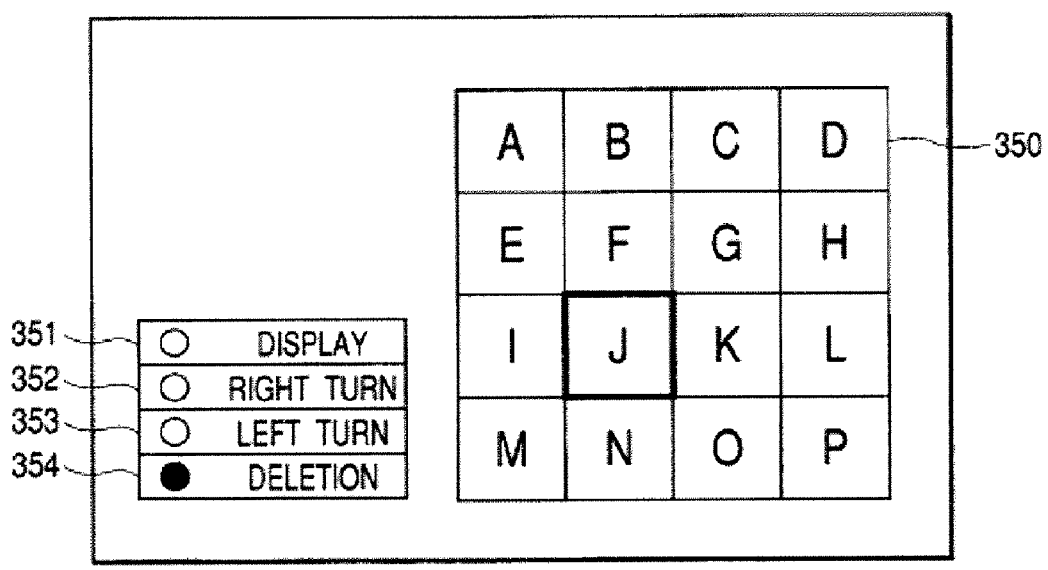
FIG. 18 is a view showing the control panel of the digital photo-album device 1300 in a condition that a check box for a process element "deletion" is selected.

Then, the control unit 1130 of the television 1000 issues PUSH_GUI command (step ST5405) to request the control panel of the VCR 1200. When such a control panel is received, the control unit 1240 of the VCR 1200 transfers the control panel in the control panel generation unit 1220 to the television 1000 via the AV/C asynchronous connection protocol layer 540 (step ST5406). The transferred control panel is stored in the display data memory 1090 of the television 1000 and then is displayed on the display unit 1110. Incidentally, in this case, the list of the history elements shown in FIG. 18 is also transferred together with the control panel.

By the above operations, the control panel of the VCR 1200 shown in FIG. 6 is displayed on the display unit 1110 of the television 1000.

In this condition, when the "finish" key 2100 shown in FIG. 2 is depressed (step ST505 in FIG. 9), screen clear process is effected (step ST540).

That is to say, in the screen clear process, returning to FIG. 10, the control unit 1130 of the television 1000 issues the GUI_UPDATE (stop) command (step ST5410). Then, Detach_Release command, Disconnect AV command and Disconnect command are issued (steps ST5411, ST5412), so that connection to the VCR 1200 via the AV/C asynchronous connection protocol layer 540 is ended and the control panel presently displayed is erased.

Returning to FIG. 9, if either one of the "up" key 2200 "down" key 2300, "left" key 2400 or "right" key 2500 is depressed (step ST503), control panel process is effected (step ST520).

In the control panel process, the control unit 1130 of the television 1000 performs the processing by properly controlling the drawing control unit 1100, display data memory 1090 and 1394 interface 1080. Upon depression of either one of the "up" key 2200, "down" key 2300, "left" key 2400 or "right" key 2500, in the control panel displayed on the display unit 1110, the cursor positioned on the selected button is shifted (up, down, left or right) in a direction indicated by the key.

For example, now, it is assumed that the control panel shown in FIG. 6 is displayed. In this case, when the "left" key 2400 is depressed, the cursor is shifted from the stop button 302 onto the temporary stop button 305. If the cursor cannot be shifted at the end, round process is effected. That is to say, for example, in a condition that the cursor 307 is positioned on the temporary stop button 305 of the control panel shown in FIG. 6, if the "left" key 2400 is depressed, the cursor 307 is shifted on the record button 306.

Further, in the control panel process, the shifting history of the cursor 307 is stored in the memory of the control unit 1130. This is one of characteristics of the first embodiment. For example, when the cursor 307 is shifted from the fast feed button 304 onto the reproduction button 301, first of all, the button ID "304" of the fast feed button 304 is stored in the memory of the control unit 1130, and, thereafter, the cursor is shifted onto the reproduction button 301. When the cursor 307 is shifted from the rewind button 303 onto the reproduction button 301, the button ID "303" of the rewind button 303 is stored in the memory of the control unit 1130.

On the other hand, if the button is released rather than depression, the cursor is not shifted.

Returning to FIG. 9, if the "determination" key 2600 is depressed or released (step ST504), control process is effected (step ST530).

In this control process, control process effected when the cursor 307 is shifted from the stop button 302 onto the reproduction button 301 and the "determination key" 2600 is depressed will firstly be described. In this case, the button ID "302" of the stop button 302 is stored in the memory of the control unit 1130.

In the control process, upon depression of the "determination" key 2600, the button ID of the button element on which the cursor 307 is positioned is read out by referring to the display data memory 1090. Here, the button ID "301" of the reproduction button 301 is read out from the display data memory 1090. And, a history element having the same button ID of the button element as that of the button element on which the cursor 307 is presently positioned is sought by referring to the "contents 1" in the list of history elements shown in FIG. 8. Here, the history elements having the history IDs "503", "504" are candidates. Since there are candidates here, next, a history element having the same contents as the contents (button ID "302" of the stop button 302) in the memory of the control unit 1130 is sought in the "contents 2" of the history elements among these candidates. Here, there is no history element having the same contents. In this case, the button ID "301" of the button element on which the cursor 307 is presently positioned is sent to the VCR 1200 together with the action code corresponding to the "depression" as user operation information.

When the VCR 1200 receives the user operation information, if the received ID is "302" and the action code is "depression", it is recognized that there is instruction of "reproduction" and the record/reproduction unit 1230 is changed to a reproduction condition and the connection regarding the isochronous transferring to the television 1000 is established and the moving image data from the record/reproduction unit 1230 is transferred to the television 1000 via the isochronous connection.

Next, control process effected when the cursor 307 is shifted from the fast feed key 304 onto the reproduction key 301 and the "determination" key 2600 is depressed will be described. In this case, the button ID "304" of the fast feed button 304 is stored in the memory of the control unit 1103.

In this control process, as is in the aforementioned control process, the button ID (button ID "301" of the reproduction button 301) of the button element on which the cursor 307 is presently positioned is read out from the display data memory 1090, and a history element having the same button ID is sought by referring to the "contents 1" of the list of the history elements. Here, the history elements having the history IDs "503", "504" are candidates. Since there are candidates here, next, a history element having the same contents as the contents (button ID "304" of the fast feed button 304) in the memory of the control unit 1130 is sought in the "contents 2" of the history elements among these candidates. Here, the history element having the history ID "504" is sought as the history element having the same contents. In this case, the history ID "504" of the history element is sent to the VCR 1200 together with the action code corresponding to the "depression" as user operation information.

When the VCR 1200 receives the user operation information, if the received ID is "504" and the action code is "depression", it is recognized that there is instruction of "fast feed reproduction" and the record/reproduction unit 1230 is changed to a fast feed reproduction condition and the connection regarding the isochronous-transferring to the television 1000 is established and the moving image data for fast feed reproduction from the record/reproduction unit 1230 is transferred to the television 1000 via the isochronous connection.

Next, control process effected when the cursor 307 is shifted from the reproduction key 301 onto the stop key 302 and the "determination" key 2600 is depressed will be described. In this case, the button ID "301" of the reproduction button 301 is stored in the memory of the control unit 1103.

In this control process, upon depression of the "determination" key 2600, the button ID (button ID "302" of the stop button 301) of the button element on which the cursor 307 is presently positioned is read out from the display data memory 1090, and a history element having the same button ID is sought by referring to the "contents 1" of the list of the history elements. Here, there is no same history element. In this case, the button ID "302" of the button element on which the cursor 307 is presently positioned is sent to the VCR 1200 together with the action code corresponding to the "depression" as user operation information.

When the VCR 1200 receives the user operation information, if the received ID is "302" and the action code is "depression", it is recognized that there is instruction of "stop" and the record/reproduction unit 1230 is changed to a stop condition and the transferring of the moving image data from the record/reproduction unit 1230 to the television 1000 is stopped and the connection regarding the isochronous transferring to the television 1000 is disconnected.

As mentioned above, when the operator shifts the cursor 307 to manipulate the "determination" key 2600, in consideration of not only the key position after the shifting of the cursor 307 but also the key position before the shifting of the cursor 307, the VCR 1200 recognizes the control contents from the television 1000. In this way, even when the number of keys of the remote controller 1140 of the television 1000 is relatively few, the operations greater than the number of keys can be effected with respect to the VCR 1200 and the transferring data amount between the television 1000 and the VCR 1200 can be reduced. That is to say, even when the operator shifts the cursor 307 onto the reproduction button 301 to manipulate the "determination" key 2600, different controls can be realized ("reproduction" with respect to the VCR 1200 when the cursor 307 is shifted from the stop button 302 onto the reproduction button 301, and "fast feed reproduction" with respect to the VCR 1200 when the cursor 307 is shifted from the fast feed button 304 onto the reproduction button 301).

Incidentally, the process effected when the "determination" key 2600 is released is substantially the same as the above-mentioned control process, except that the action code corresponding to "release" is sent to the VCR 1200 as user operation information in place of the code corresponding to "depression".

For example, when the cursor 307 is shifted from the stop button 302 onto the reproduction button 301 and the "determination" key 2600 is depressed and then is released, the button ID "301" of the button element on which the cursor 307 is presently positioned and the action code corresponding to "release" are sent to the VCR 1200 as the user operation information.

When the cursor 307 is shifted from the fast feed button 304 onto the reproduction button 301 and the "determination" key 2600 is depressed and then is released, the history ID "504" of the history element and the action code corresponding to "release" are sent to the VCR 1200 as the user operation information.

When the cursor 307 is shifted from the reproduction button 301 onto the stop button 302 and the "determination" key 2600 is depressed and then is released, the button ID "302" of the button element on which the cursor 307 is presently positioned and the action code corresponding to "release" are sent to the VCR 1200 as the user operation information.

Although the VCR 1200 receives them, the condition of the record/reproduction unit 1230 is not changed here.

Next, the operation of the VCR 1200 effected when the action code corresponding to "release" is received will be described.

Now, it is assumed that the record/reproduction unit 1230 of the VCR 1200 is in the reproduction condition. In this condition, when the fast feed button 304 is depressed, as mentioned above, the button ID "304" of the button element on which the cursor 307 is presently positioned and the action code corresponding to "depression" are sent to the VCR 1200 as the user operation information.

When the VCR 1200 receives the user operation information, since the received ID is "304" and the action code is "depression" and the record/reproduction unit 1230 is now in the reproduction condition, it is recognized that there is instruction of "fast feed reproduction" and the record/reproduction unit 1230 is changed to a fast feed reproduction condition and the moving image data for the fast feed reproduction from the record/reproduction unit 1230 is transferred to the television 1000 via the isochronous connection.

Then, when the fast feed button 304 is released, as mentioned above, the button ID "304" of the button element on which the cursor 307 is presently positioned and the action code corresponding to "release" are sent to the VCR 1200 as the user operation information.

When the received ID is "304" and the action code is "release", the VCR 1200 which received the user operation information recognizes the instruction of release of "fast feed reproduction", and the record/reproduction unit 1230 is changed to the reproduction condition, and the moving image data for reproduction from the record/reproduction unit 1230 is transferred to the television 1000 via the isochronous connection.

As mentioned above, according to the first embodiment, when the operator shifts the cursor 307 to manipulate the "determination" key 2600, in consideration of not only the key position after the shifting of the cursor 307 but also the key position before the shifting of the cursor 307, the VCR 1200 recognizes the control contents from the television 1000. In this way, even when the number of keys of the remote controller 1140 of the television 1000 is relatively few, the operations greater than the number of keys can be effected with respect to the VCR 1200 and the transferring data amount between the television 1000 and the VCR 1200 can be reduced.

Second Embodiment

Next, a second embodiment of the present invention will be explained. Since a construction of the second embodiment is fundamentally the same as that of the first embodiment, the same constructional elements as those of the first embodiment will be omitted in the explanation of the second embodiment.

Figure 11:
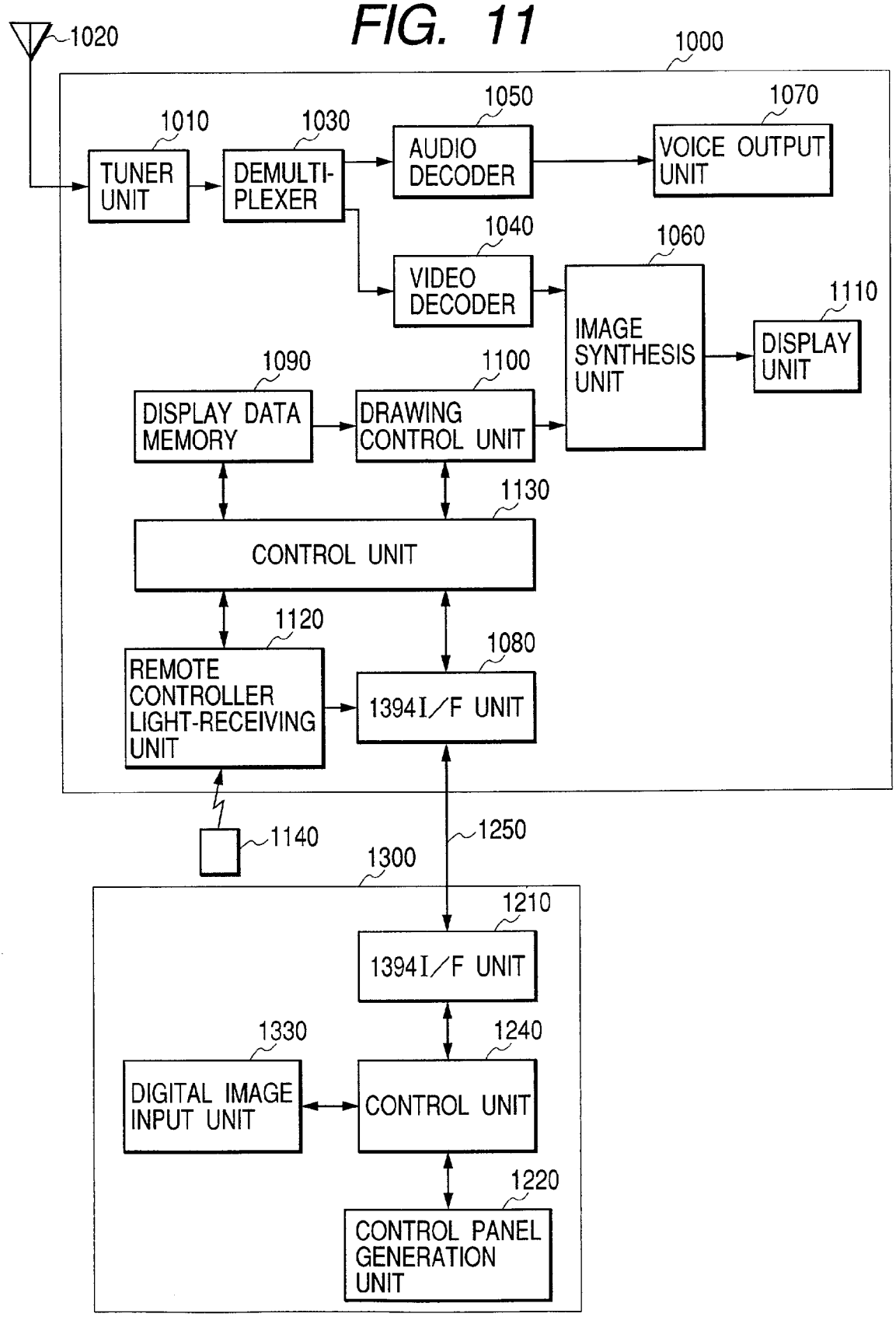
FIG. 11 is a block diagram for explaining a construction of a remote control system according to a second embodiment of the present invention.

FIG. 11 is a block diagram showing a construction of a remote control system according to the second embodiment. In FIG. 11, the same elements as those in the first embodiment are designated by the same reference numerals and explanation thereof will be omitted.

In the second embodiment, the reference numeral 1300 denotes a digital photo-album device as a controlled device, and a 1394 interface 1210 and a control panel generation unit 1220 are the same as those in the VCR 1200 of the first embodiment.

The digital photo-album device includes a digital image memory unit 1330 for storing a digital photo image. The digital image memory unit 1330 is like as a compact flush card normally used in a digital camera but may be the compact flush card itself. Further, the digital image memory unit 1330 may be secured to or detachably attached to the digital photo-album device 1300.

A control unit 1240 has fundamentally the same construction of the control unit of the VCR 1200 of the first embodiment. However, contents of a control panel outputted from the control panel generation unit 1220 and control for sending the digital photo image in the digital image memory unit 1330 to the external unit differ from the first embodiment.

Incidentally, similar to the first embodiment, the television 1000 and the digital photo-album device 1300 are interconnected via the IEEE 1394 serial bus 1250.

With the above-mentioned arrangement, only parts different from the first embodiment will be explained hereinbelow.

Figure 12:
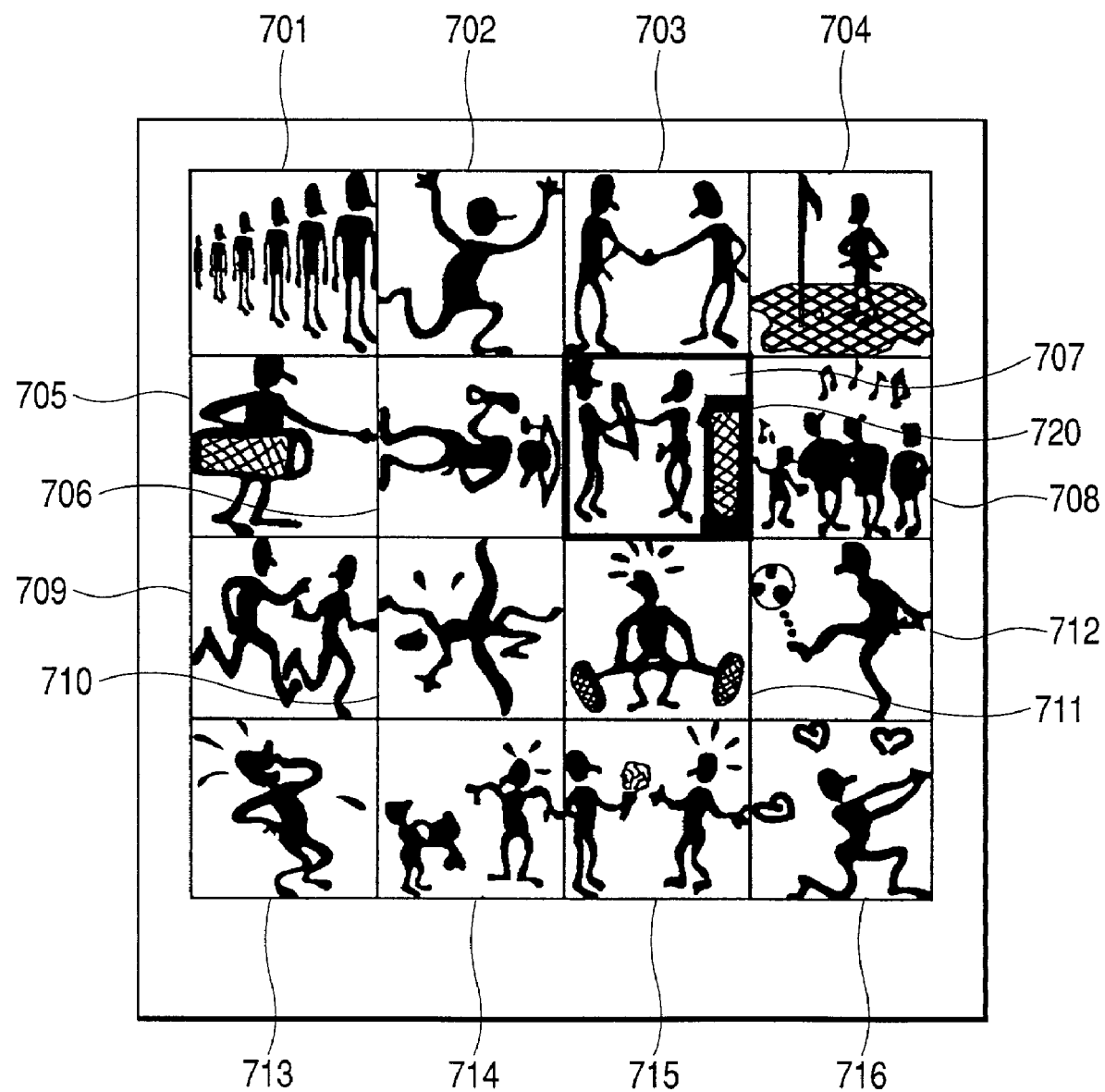
FIG. 12 is a view showing a control panel of a digital photo-album device 1300 displayed on a television 1000.

FIG. 12 is a view showing a control panel of the digital photo-album device 1300 displayed on the television 1000.

In FIG. 12, the control panel includes button elements 701 to 716 which use the digital photo image in the digital image memory unit 1330 as bit map data and the digital image memory unit 1330 is thumbnail-displayed. The control panel also includes a cursor added by the drawing control unit 1100 of the television 1000.

Now, the button element 706 will be described as an example.

The button element 706 has "706" as button ID, as well as the following history group comprising previously set plural button IDs:

button ID 706;
button ID 707;
button ID 703; and
button ID 702.

Incidentally, for example, history group ID "806" is afforded to the history group.

Further, the plural button IDs (four button IDs in this example) can be stored in the memory of the control unit 1130 in an FIFO fashion.

Now, it is assumed that a cursor 720 is positioned on a button element 710. Here, an operation of control panel process in this case will be explained hereinbelow.

Here, for example, when the "up" key 2200 is depressed, button ID "710" of the button element 710 is stored in the memory of the control unit 1130, and the cursor 720 is shifted onto the button element 706. Then, when the "right" key 2500 is depressed, button ID "706" of the button element 706 is stored in the memory of the control unit 1130, and the cursor 720 is shifted onto the button element 707. Then, when the "up" key 2200 is depressed, button ID "707" of the button element 707 is stored in the memory of the control unit 1130, and the cursor 720 is shifted onto the button element 703. Then, the "left" key 2400 is depressed, button ID "703" of the button element 703 is stored in the memory of the control unit 1130, and the cursor 720 is shifted onto the button element 702. At this point, four button IDs are stored in the memory of the control unit 1130. Then, when the "down" key 2300 is depressed, although button ID "702" of the button element 702 is stored in the memory of the control unit 1130, since the four button IDs were already stored in the memory of the control unit 1130, the oldest button ID "710" is erased, and the button ID "702" of the button element 702 is newly stored. Then, the cursor 720 is shifted onto the button element 706. In this case, the stored contents of the memory of the control unit 1130 become "706, 707, 703, 702".

Here, when the "determination" key 2600 is depressed, control process is effected.

In the control process according to the second embodiment, the history group of the button element (button element 706 in this case) on which the cursor 720 is presently positioned is compared with the contents stored in the memory of the control unit 1130.

Here, the result of comparison shows coincidence. In this case, ID (i.e., "806") of the history group of the button element (button element 706 in this case) on which the cursor 720 is presently positioned is sent to the digital photo-album device 1300 together with the action code corresponding to "depression" as user operation information.

Figure 13:
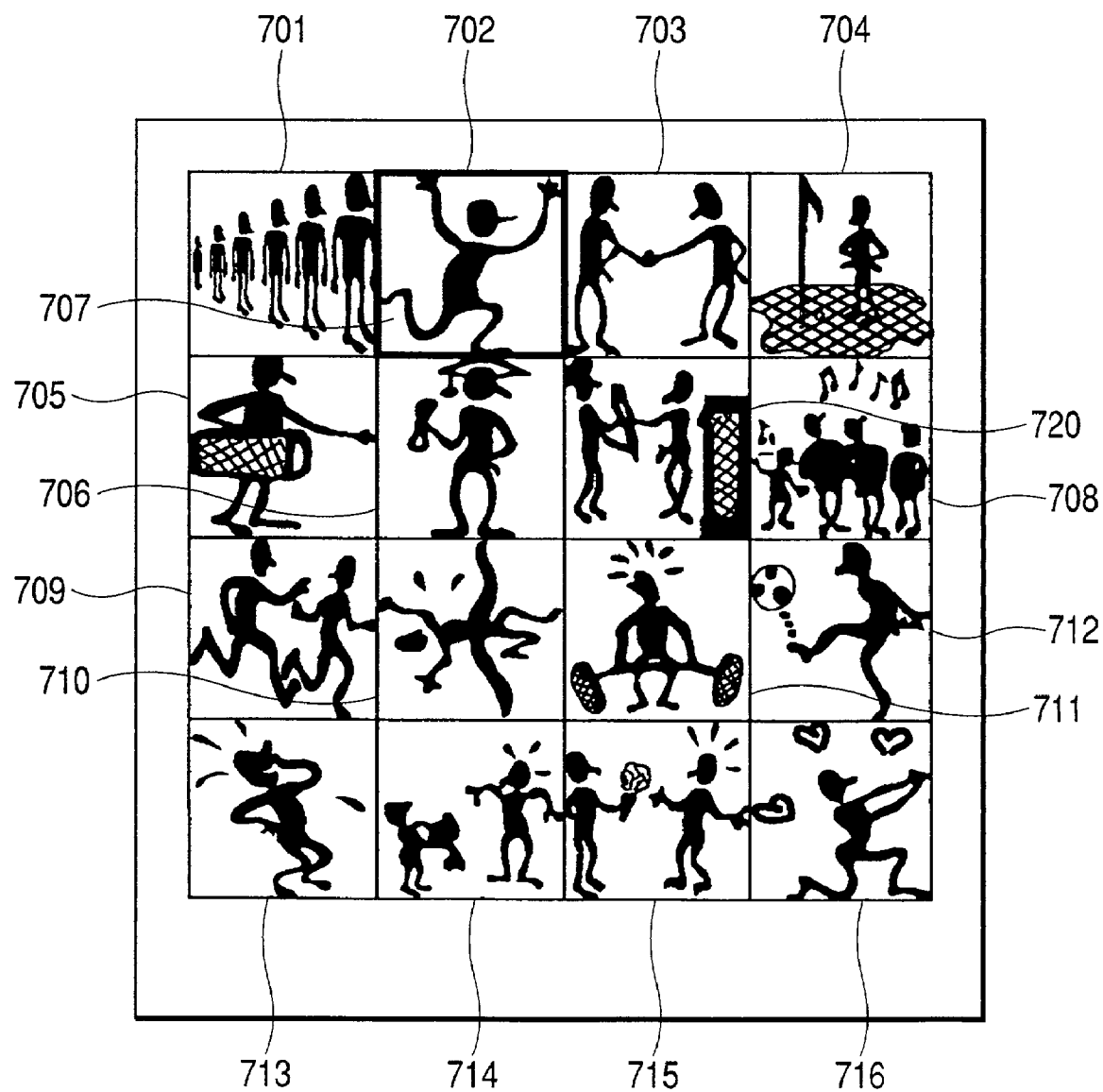
FIG. 13 is a view showing the control panel of the digital photo-album device 1300 after the control panel is renewed.
Figure 14:
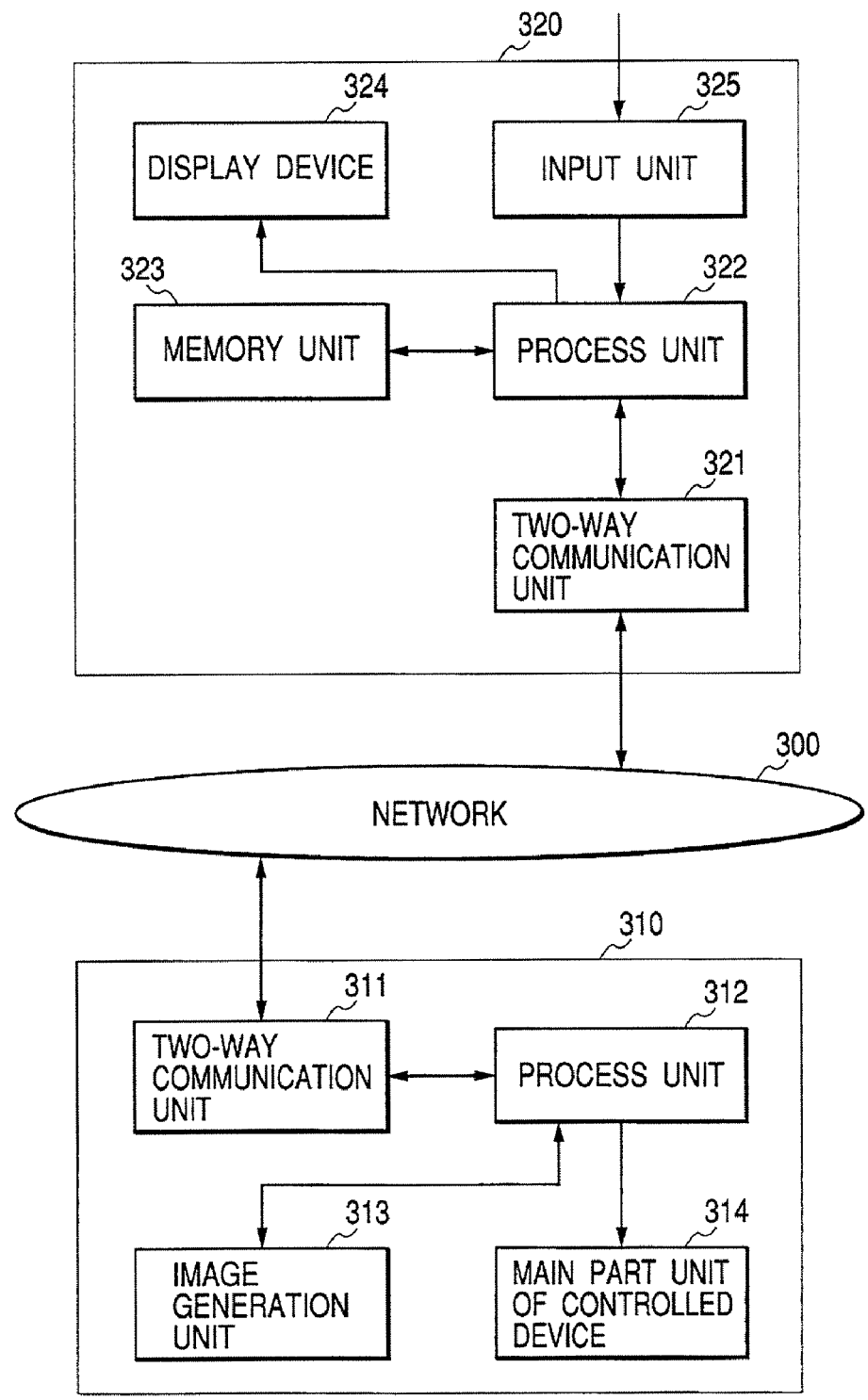
FIG. 14 is a block diagram showing a construction of a conventional remote control system.
Figure 15:
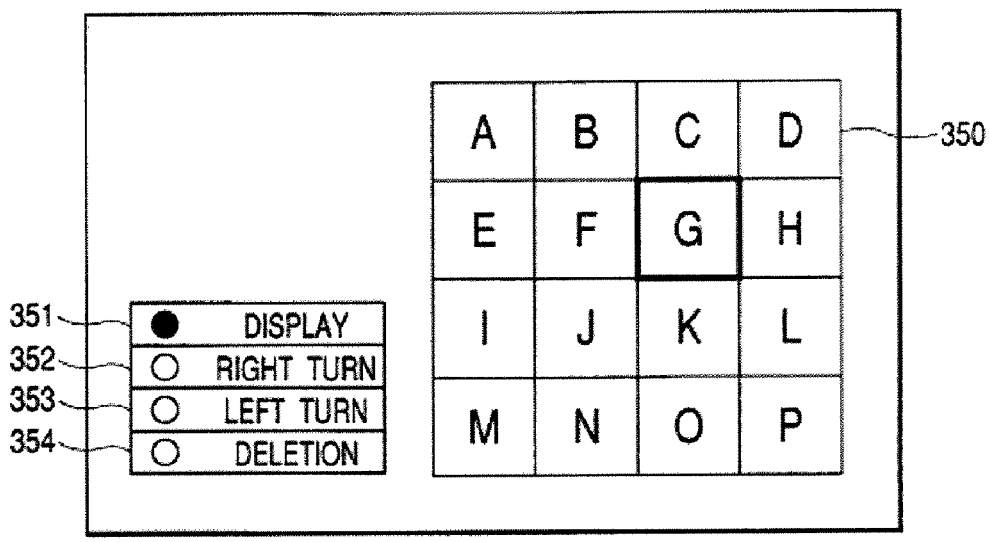
FIG. 15 is a view showing a control panel of a digital photo-album device 1300 displayed on a television in the conventional remote control system.
Figure 16:
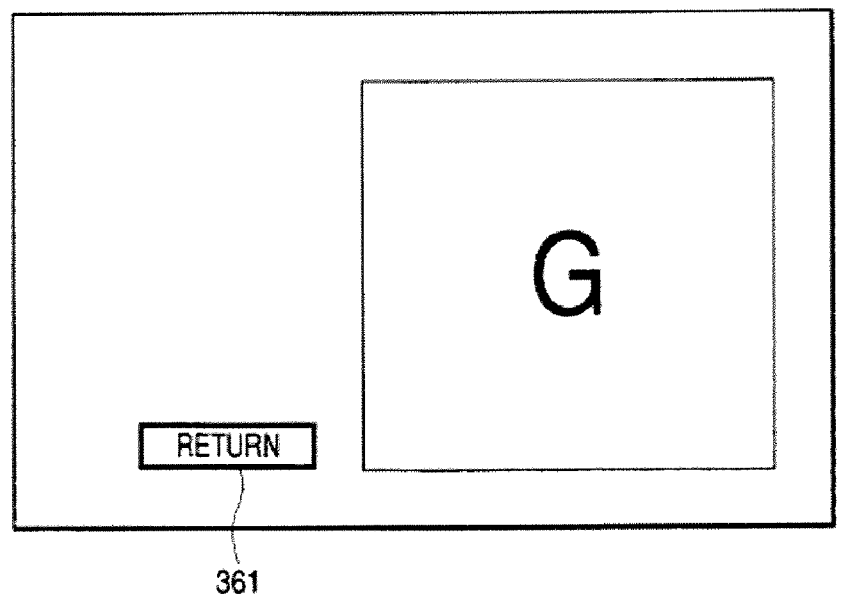
FIG. 16 is a view showing a screen of the television on which a digital photo image G is displayed in a larger scale.
Figure 17:
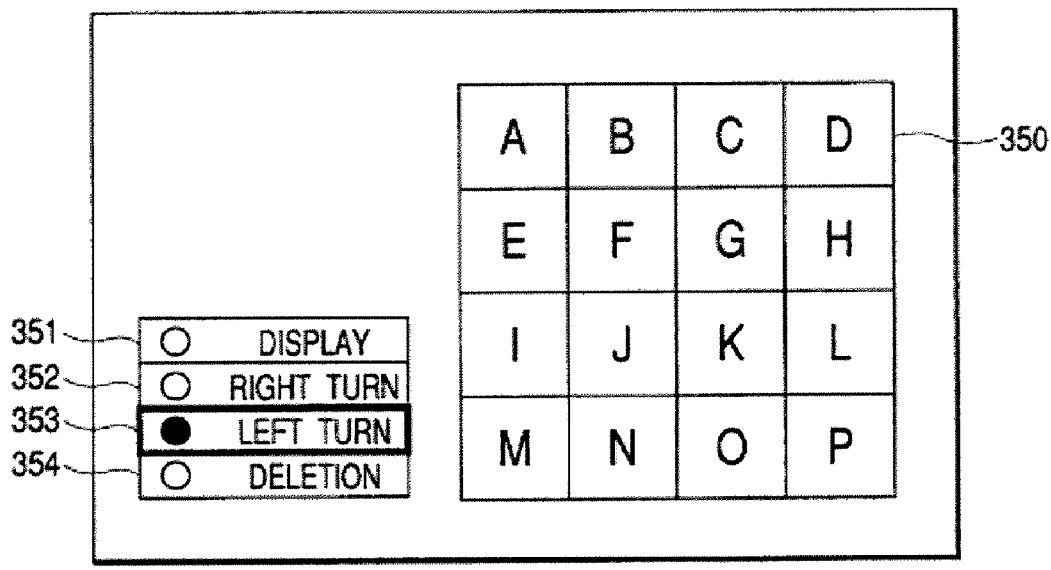
FIG. 17 is a view showing the control panel of the digital photo-album device 1300 in a condition that a check box for a process element "left turn" is selected.

If the received ID is "806" and the action code is "depression", the digital photo-album device 1300 which received the user operation information recognizes instruction for left-turning the image of the button element having the button ID "706", and left turn process for the bit map data of the button element having the button ID "706" is effected, and the bit map data of the button element after the left turn process is transferred to the television 1000 via the connection in the AV/C asynchronous connection protocol layer 540. By such transferring, the television 1000 to which the fact that the control panel is changed is noticed renews or updates the display of the control panel. A renewed control panel of the digital photo-album device 1300 is shown in FIG. 13.

Incidentally, the result of comparison between the history group of the button element on which the cursor 720 is presently positioned and the contents stored in the memory of the control unit 1130 does not show coincidence, the button ID (button ID "706" in the above case) of the button element on which the cursor 720 is presently positioned is sent to the digital photo-album device 1300 together with the action code corresponding to "depression" as user operation information.

If the received ID is "706" and the action code is "depression", the digital photo-album device 1300 which received the user operation information recognizes instruction for displaying the image of the button element having the button ID "706" in a larger scale (same as conventional thumbnail display), and process according to such instruction is effected.

Incidentally, in the control process according to the second embodiment, after the user operation information was sent, the memory of the control unit 1300 is cleared.

In the control process mentioned above, it should be noted that the shifting trace of the cursor 720 becomes like a left turn circle including the button element 706.

Incidentally, here, the history group of the button element 706 may including the following IDs:
  button ID 706;
  button ID 710;
  button ID 711; and
  button ID 707.

In this case, by shifting the cursor 720 onto the button element 706, button element 710, button element 711, button element 707 and button element 706 in order and by depressing the "determination" key 2600, the similar process to the above-mentioned instruction for left-turning and displaying the image of the button element 706 can be realized.

Further, the button element 706 may have the following two history groups:
  button ID 706;
  button ID 707;
  button ID 703;
  button ID 702; and
  button ID 706;
  button ID 710;
  button ID 711;
  button ID 707.

In this case, even when the cursor 720 is shifted onto the button element 706, button element 707, button element 703, button element 702 and button element 706 in order or even when the cursor 720 is shifted onto the button element 706, button element 710, button element 711, button element 707 and button element 706 in order, by depressing the "determination" key 2600 immediately after, the similar process to the above-mentioned instruction for left-turning and displaying the image of the button element 706 can be realized.

Furthermore, as mentioned above, since the memory of the control unit 1130 is cleared after the user operation information was sent, even in a case where the shifting history of the cursor 720 includes, for example, the fact that the cursor was shifted onto the button element 706, button element 707, button element 703, button element 702 and button element 706 in order, when the "determination" key 2600 is depressed in the condition that the cursor 720 is positioned on the button element 702, if the cursor 720 is then shifted onto the button element 706 and the "determination" key 2600 is depressed, since the history group of the button element on which the cursor 720 is presently positioned differs from the contents stored in the memory of the control unit 1130, the above-mentioned process for left-turning and displaying the image of the button element 706 is not effected.

Furthermore, the history group of the button element 706 may include the following IDs:
  button ID 706;
  button ID 702;
  button ID 703; and
  button ID 707.

In this case, when the cursor 720 is shifted onto the button element 706, button element 702, button element 703, button element 707 and button element 706 in order and the "determination" key 2600 is depressed, instruction for left-turning and displaying the image of the button element 706 can be realized.

As mentioned above, according to the second embodiment, by shifting the cursor along the left turn circle starting from the target image, the instruction for left-turning the target image can be achieved, and, by shifting the cursor along a right turn circle starting from the target image, the instruction for right-turning the target image can be achieved. That is to say, an operational environment in which the operator can easily effect manipulation intuitively can be provided.

Incidentally, in the remote control system according to the above-mentioned embodiments, while an example that the control device is constituted by the television and the controlled device is constituted by the video cassette recorder or the digital photo-album device 1300 was explained, the present invention can be applied as a method in which the number of operations is increased without increasing the number of keys of the remote controller 1140 in the television.

Incidentally, it should be noted that the present invention can be achieved by supplying a storing medium storing a program code of software for executing the functions of the above-mentioned embodiments to the system or the apparatus and by reading out and executing the program code stored in the storing medium by means of a computer (or CPU or MPU) of the system or the apparatus.

In this case, the program code itself read out from the storing medium realizes new functions of the above-mentioned embodiments, and, thus, the storing medium storing such program code constitutes the present invention.

As the storing medium for supplying the program code, for example, a floppy disk, a hard disk, an optical disk, a photomagnetic disk, CD-ROM, CD-R, a magnetic tape, a non-volatile memory card or ROM can be used.

Further, it should be noted that the present invention includes a concept that not only the functions of the above-mentioned embodiments are realized by executing the program code read out by means of the computer, but also OS (operating system) running on the computer executes the actual processing partially or totally on the basis of instruction of the program code to realize the functions of the embodiments.

Further, it should be noted that the present invention includes a concept that, after the program code read out from the storing medium is written in a memory of a function expansion board inserted into the computer or a function expansion unit connected to the computer, a CPU of the function expansion board or of the function expansion unit executes the actual processing partially or totally on the basis of instruction of the program code to realize the functions of the embodiments.

Further, in the above-mentioned preferred embodiments of the present invention, while an example that the communication circuit for interconnecting the control device and the controlled device is constituted by the IEEE 1394 serial bus 1250 was explained, the present invention is not limited to such a communication circuit.

The invention may be embodied in other specific forms without departing from essential characteristics thereof.

Therefore, the above-described embodiments are merely exemplary of this invention, and are not be construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. A control device for remotely controlling a controlled device, comprising:
   a display unit that displays a control panel used to control the controlled device, the control panel including a cursor that can shift among button elements;
   a control unit that produces operation information; and
   a communication unit that sends the operation information to the controlled device,
   wherein the operation information includes identification information corresponding to a shifting history of the cursor, and a code corresponding to depression, and
   wherein the shifting history of the cursor includes identification information of button elements selected by the cursor.

2. A control device according to claim 1, wherein the control device is a television.

3. A control device according to claim 2, wherein the controlled device is a digital photo-album device.

4. A control device according to claim 1, wherein the communication unit communicates with the controlled device via a serial bus.

5. A controlled device controlled remotely by a control device, comprising:
   a communication unit that sends a control panel used to control the controlled device to the control device, and receives operation information from the control device, the control panel including a cursor that can shift among button elements; and
   a control unit that controls the controlled device using the operation information,
   wherein the operation information includes identification information corresponding to a shifting history of the cursor, and a code corresponding to depression, and
   wherein the shifting history of the cursor includes identification information of button elements selected by the cursor.

6. A controlled device according to claim 5, wherein the control device is a television.

7. A controlled device according to claim 6, wherein the controlled device is a digital photo-album device.

8. A controlled device according to claim 5, wherein the communication unit communicates with the control device via a serial bus.

9. A control device according to claim 4, wherein the serial bus conforms to IEEE 1394-1995 standard.

10. A control device according to claim 3, wherein the communication unit communicates with the controlled device via a serial bus.

11. A controlled device according to claim 8, wherein the serial bus conforms to IEEE 1394-1995 standard.

12. A controlled device according to claim 7, wherein the communication unit communicates with the control device via a serial bus.

* * * * *